US006998844B2

(12) United States Patent
Omeragic et al.

(10) Patent No.: US 6,998,844 B2
(45) Date of Patent: Feb. 14, 2006

(54) PROPAGATION BASED ELECTROMAGNETIC MEASUREMENT OF ANISOTROPY USING TRANSVERSE OR TILTED MAGNETIC DIPOLES

(75) Inventors: Dzevat Omeragic, Sugar Land, TX (US); Jacques R. Tabanou, Houston, TX (US); Alain Dumont, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/249,030

(22) Filed: Mar. 11, 2003

(65) Prior Publication Data

US 2003/0200029 A1  Oct. 23, 2003

Related U.S. Application Data

(60) Provisional application No. 60/374,163, filed on Apr. 19, 2002.

(51) Int. Cl.
*G01V 3/10* (2006.01)
(52) U.S. Cl. ...................... 324/343; 324/338
(58) Field of Classification Search ........ 324/338–339, 324/343
See application file for complete search history.

(56) References Cited

U.S. PATENT DOCUMENTS

| 3,187,252 | A |   | 6/1965  | Hungerford |
|-----------|---|---|---------|------------|
| 4,302,722 | A |   | 11/1981 | Gianzero |
| 4,302,723 | A |   | 11/1981 | Moran |
| 4,314,251 | A | * | 2/1982  | Raab ............................ 342/463 |
| 4,319,191 | A | * | 3/1982  | Meador et al. .............. 324/341 |
| 4,360,777 | A | * | 11/1982 | Segesman ..................... 324/339 |
| 4,636,731 | A |   | 1/1987  | Savage et al. |
| 4,831,331 | A | * | 5/1989  | De et al. ...................... 324/338 |
| 4,899,112 | A | * | 2/1990  | Clark et al. .................. 324/338 |
| 4,968,940 | A | * | 11/1990 | Clark et al. .................. 324/338 |
| 4,972,150 | A |   | 11/1990 | Tabbagh |
| 5,115,198 | A | * | 5/1992  | Gianzero et al. ............ 324/339 |
| 5,210,495 | A | * | 5/1993  | Hapashy et al. ............. 324/338 |
| 5,508,616 | A | * | 4/1996  | Sato et al. ................... 324/343 |
| 5,530,359 | A | * | 6/1996  | Habashy et al. ............. 324/338 |
| 5,757,191 | A | * | 5/1998  | Gianzero ..................... 324/339 |
| 5,781,436 | A | * | 7/1998  | Forgang et al. ................ 702/7 |
| 5,854,991 | A |   | 12/1998 | Gupta et al. |
| 5,999,883 | A |   | 12/1999 | Gupta et al. |
| 6,044,325 | A | * | 3/2000  | Chakravarthy et al. ......... 702/7 |
| 6,147,496 | A | * | 11/2000 | Strack et al. ................. 324/343 |
| 6,163,155 | A |   | 12/2000 | Bittar |
| 6,181,138 | B1| * | 1/2001  | Hagiwara et al. ............ 324/338 |
| 6,297,639 | B1|   | 10/2001 | Clark et al. |
| 6,304,086 | B1| * | 10/2001 | Minerbo et al. ............. 324/338 |

(Continued)

OTHER PUBLICATIONS

BF Kriegshauser et al., "Wellsite Interpretation of Multicomponent Induction Log Datain Anisotropic Media," *SPE 62906*, SPE Annual Technical Conference and Exhibition, Dallas, TX (Oct. 1-4, 2000).

(Continued)

*Primary Examiner*—Jay Patidar
(74) *Attorney, Agent, or Firm*—Kevin P. McEnaney; Bryan L. White; Victor H. Segura

(57) ABSTRACT

Transverse or tilted magnetic dipole antenna systems are used for electromagnetic logging measurements to determine the anisotropic resistivity of subsurface formations. Combined measurements between transverse or tilted antennas, as well as axial antennas, are used to compensate for receiver antenna mismatch in the system. Some embodiments use model-based parametric inversion to estimate the anisotropic resistivity in the presence of invasion and shoulder-bed effects.

25 Claims, 9 Drawing Sheets

U.S. PATENT DOCUMENTS

| | | |
|---|---|---|
| 6,393,364 B1 | 5/2002 | Gao et al. |
| 6,476,609 B1 | 11/2002 | Bittar |
| 6,556,016 B1 * | 4/2003 | Gao et al. .................... 324/343 |
| 6,566,881 B1 * | 5/2003 | Omeragic et al. .......... 324/338 |
| 6,636,045 B1 | 10/2003 | Tabarovsky et al. |
| 6,911,824 B1 * | 6/2005 | Bittar ........................ 324/338 |
| 2002/0149997 A1 | 10/2002 | Zhang et al. |
| 2002/0173913 A1 | 11/2002 | Tabarovsky et al. |
| 2002/0186013 A1 | 12/2002 | Tabarovsky et al. |
| 2003/0016020 A1 | 1/2003 | Gianzero et al. |
| 2003/0018434 A1 | 1/2003 | Kriegshauser et al. |
| 2003/0055565 A1 | 3/2003 | Omeragic |
| 2003/0105591 A1 | 6/2003 | Hagiwara |

OTHER PUBLICATIONS

JH Schoen et al., "Aspects of Multicomponent Resistivity Data and Macroscopic Resistivity Anisotropy," *SPE 62909, SPE Annual Technical conference and Exhibition*, Dallas, TX (Oct. 1-4, 2000).

B Kriegshauser et al., "A New Multicomponent Induction Logging Tool to Resolve Anisotropic Formations," *SPWLA 41$^{st}$ Annual Logging Symposium* (Jun. 4-7, 2000).

* cited by examiner

PROPAGATION BASED ELECTROMAGNETIC MEASUREMENT OF ANISOTROPY USING TRANSVERSE OR TILTED MAGNETIC DIPOLES

CROSS REFERENCE TO RELATED APPLICATIONS

This present application claims the benefit of U.S. Provisional Application No. 60/374,163 filed Apr. 19, 2002.

BACKGROUND OF INVENTION

1. Field of the Invention

The present invention is generally directed to the analysis of underground earth formations, and, more particularly, to the determination of formation resistivity properties and/or profiles.

2. Description of Related Art

Electromagnetic (EM) logging tools have been employed in the field of subsurface exploration for many years. These logging tools or instruments entail an elongated support equipped with antennas that are operable as sources or sensors. The antennas on these tools are generally formed as loops or coils of conductive wire. In operation, a transmitter antenna is energized by an alternating current to emit EM energy through the borehole fluid ("mud") and into the surrounding formations. The emitted energy interacts with the borehole and formation to produce signals that are detected and measured by one or more receiver antennas. The detected signals reflect the interaction with the mud and the formation. The measurements are also affected by mud filtrate invasion that changes the properties of the rock near the wellbore. By processing the detected signal data, a log or profile of the formation and/or borehole properties is determined.

Conventional logging techniques include "wireline" logging and logging-while-drilling (LWD) or measurement-while-drilling (MWD). A developing method, sometimes referred to as logging-while-tripping (LWT), involves sending a small diameter "run-in" tool through the drill pipe to measure the downhole properties as the drill string is extracted or tripped out of the hole. These logging techniques are well known in the art.

A coil or loop-type antenna carrying a current can be represented as a magnetic dipole having a magnetic moment strength proportional to the product of the current and the area encompassed by the coil. The magnetic moment direction can be represented by a vector perpendicular to the plane of the coil. In the case of more complicated coils, which do not lie in a single plane (e.g. saddle coils as described in published U.S. patent application No. 20010004212 A1, published Jun. 21, 2001), the direction of the dipole moment is given by:

$$\int r \times dl$$

and is perpendicular to the effective area of the coil. This integral relates to the standard definition of a magnetic dipole of a circuit. Integration is over the contour that defines the coil, r is the position vector and dl is the differential segment of the contour.

In conventional EM induction and propagation logging tools, the transmitter and receiver antennas are typically mounted with their axes along, or parallel, to the longitudinal axis of the tool. Thus, these instruments are implemented with antennas having longitudinal magnetic dipoles (LMD). An emerging technique in the field of well logging is the use of tools with tilted antennas, i.e., where the antenna's magnetic moment or axis is not parallel to the support axis, or tools with transverse antennas, i.e., where the antenna's magnetic moment or axis is at 90 degrees to the support axis. These tools are thus implemented with antennas having a transverse or tilted magnetic dipole moment/axis (TMD). One logging tool configuration comprises triaxial antennas, involving three coils with magnetic moments that are not co-planar. The aim of these TMD configurations is to provide EM measurements with directed sensitivity. Logging tools equipped with TMDs are described in U.S. Pat. Nos. 6,044,325, 4,319,191, 5,115,198, 5,508,616, 5,757,191, 5,781,436 and 6,147,496.

EM propagation tools measure the resistivity (or conductivity) of the formation by transmitting radio frequency signals into the formation and using receivers to measure the relative amplitude and phase of the detected EM signals. These tools transmit the EM energy at a frequency in the range of about 0.1 to 10 MHz. A propagation tool typically has two or more receivers disposed at different distances from the transmitter(s). The signals reaching the receivers travel different distances and are attenuated to different extents and are phase-shifted to different extents. In analysis, the detected signals are processed to derive a magnitude ratio (attenuation) and phase difference (phase shift). The attenuation and phase shift of the signals are indicative of the conductivity of the formation. U.S. Pat. Nos. 4,899,112 and 4,968,940 describe conventional propagation tools and signal processing.

Resistivity anisotropy is a characteristic of subsurface earth formations that can complicate the evaluation and characterization of potential and existing hydrocarbon-bearing zones. Many reservoir rocks exhibit resistivity anisotropy, especially when saturated with oil. There are several mechanisms, which can produce this anisotropy, among which are very thin sand-shale laminations, depositional changes in clean sandstone, and wind-distributed sands (aeolian formations). Some or all of the individual earth layers can be electrically anisotropic, meaning that the resistivity as measured in one direction along any one layer is different than the resistivity measured in another direction along the layer. Typical anisotropic earth formation layers have a principal resistivity value measured in a direction along the layer's boundaries, generally known as "horizontal resistivity", and another principal resistivity value measured in a direction perpendicular to the layer's boundaries, generally known as "vertical resistivity". Collectively, the values of the properties for each layer, the thickness of each layer, and the distances from the wellbore to the boundaries are referred to as "parameters."

Several prior art tools are available for investigating anisotropic or inhomogeneous formations or formation boundaries. For example, U.S. Pat. No. 5,530,359 discloses a logging tool with multiple transmitter and receiver antennas for detecting locations of formation boundaries. U.S. Pat. No. 6,181,138 discloses a logging tool having skewed antennas for directional resistivity measurements for azimuthal proximity detection of bed boundaries.

There remains a need for improved techniques to indicate and evaluate resistivity anisotropy of potential hydrocarbon-bearing zones in subsurface formations.

SUMMARY OF INVENTION

The invention provides a well logging system for determining an anisotropy parameter of a subsurface formation.

The system includes an elongated support having a longitudinal axis and adapted for subsurface disposal while drilling a borehole through the formation; a plurality of transmitter antennas disposed on the support, at least one of the antennas having its magnetic moment oriented at an angle with respect to the support axis, each of the antennas adapted to transmit electromagnetic energy; a pair of receiver antennas disposed on the support with their axes oriented at an angle with respect to the support axis, the antennas adapted to detect electromagnetic signals associated with the energy transmitted from said transmitter antennas; wherein the at least one angled transmitter antenna or one of the receiver antennas is disposed with its respective magnetic moment or axis at a ninety-degree angle with respect to the support axis; and processor means adapted to combine detected electromagnetic signals associated with the transmitter or receiver antenna oriented at the ninety-degree angle with detected electromagnetic signals associated with another antenna of the plurality of transmitter antennas to determine the anisotropy parameter.

The invention provides a well logging system for determining an anisotropy parameter of a subsurface formation. The system includes an elongated support having a longitudinal axis and adapted for subsurface disposal while drilling a borehole through the formation; first and second transmitter antennas disposed on the support with their magnetic moments having matching orientations with respect to the support axis, the antennas adapted to transmit electromagnetic energy; a pair of receiver antennas disposed on the support with their axes oriented at an angle with respect to the support axis and located between the first and second transmitter antennas, the receiver antennas adapted to detect electromagnetic signals; and processor means adapted to combine detected electromagnetic signals relating to a phase difference or a magnitude ratio to compensate for a mismatch between the pair of receiver antennas to determine the anisotropy parameter.

The invention provides a method for determining an anisotropy parameter of a subsurface formation in which an elongated support having a longitudinal axis and adapted for subsurface disposal while drilling a borehole through the formation is received. The method includes selectively transmitting electromagnetic energy into the formation from a plurality of transmitter antennas disposed on the support, at least one of the antennas having its magnetic moment oriented at an angle with respect to the support axis; detecting electromagnetic signals associated with the energy transmitted from the transmitter antennas with a pair of receiver antennas disposed on the support with their axes oriented at an angle with respect to the support axis, wherein one of the receiver antennas or the at least one angled transmitter antenna is disposed with its respective axis or magnetic moment at a ninety-degree angle with respect to the support axis; and combining detected electromagnetic signals associated with the transmitter or receiver antenna oriented at the ninety-degree angle with detected electromagnetic signals associated with another antenna of the plurality of transmitter antennas to determine the anisotropy parameter.

BRIEF DESCRIPTION OF DRAWINGS

Other aspects and advantages of the invention will become apparent upon reading the following detailed description and upon reference to the drawings in which.

DETAILED DESCRIPTION

In propagation logging, a high-frequency alternating current is sent through the transmitter antenna. The alternating magnetic field created in the transmitter produces currents (eddy currents) in the formation surrounding the borehole. The ground loop currents are directly proportional to the formation conductivity. The voltage detected at the receiver(s) is proportional to the ground loop currents and, therefore, to the conductivity of the formation.

It is well known that in the low frequency limit, the real part of TMD-antenna coupling in vertical wells is proportional to vertical conductivity. That suggests the use of a low frequency induction-type measurement at conventional induction tool frequencies. However, induction measurements are not always practical in LWD operations. Instead, propagation measurements at substantially higher frequencies are commonly used. As the frequency increases, the tool responses become sensitive to a combination of horizontal and vertical resistivity, and at very high frequencies the sensitivity to anisotropy for typical formation parameters is very small. The sensitivity to anisotropy of a TMD-based propagation tool can be increased by reducing the frequency (approximately in the range of 3–10 times), compared to conventional propagation tools using axial (LMD) antennas such as described in U.S. Pat. Nos. 4,899,112 and 4,968,940.

A feature of the propagation-type measurement is that it relies on the amplitude of signal variations, particularly as the tool rotates in the case of LWD measurements, and not on the absolute levels: the product is not affected by any constant signal that may be added. The measurement is sensitive to receiver gain mismatch. Conventional tools use a measurement technique known as borehole compensation (See U.S. Pat. No. 4,899,112). It is based on tool symmetrization and use of a second transmitter strategically placed with respect to a receiver pair. A disadvantage of such antenna configurations is the increased length of the tool required. In the case of anisotropy measurement, an alternative is possible.

Any measurement that is sensitive to the receivers gain mismatch can be used for compensation. The signals from an axially oriented transmitter can be used for that purpose. These signals are not sensitive to anisotropy; they will add a constant term that will not affect the variations, which contain the valuable information.

Figure 1:
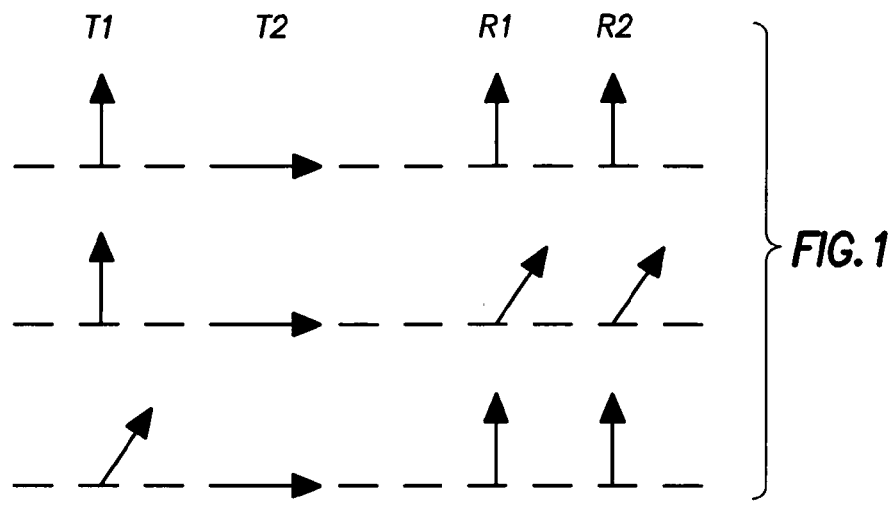
FIG. 1 shows a TMD-based well logging antenna system according to the invention.

FIG. 1 shows layouts of TMD-based tool configurations according to the invention. The antennas T1, T2, R1, R2 are depicted as arrows to represent their respective magnetic dipoles/axes and the elongated tool axis is shown as a dashed line for clarity. By combining the anisotropy-sensitive signals received from the TMD transmitter T1 on the pair of TMD receivers R1, R2 with the signals received from the LMD transmitter T2 on the same receivers, the sensitivity of the anisotropy measurement to any mismatch between the gains and phase of the receivers and their associated electronics can be eliminated. By the principle of reciprocity, this measurement also applies when the roles of the transmitters and receivers are switched.

Figure 2:
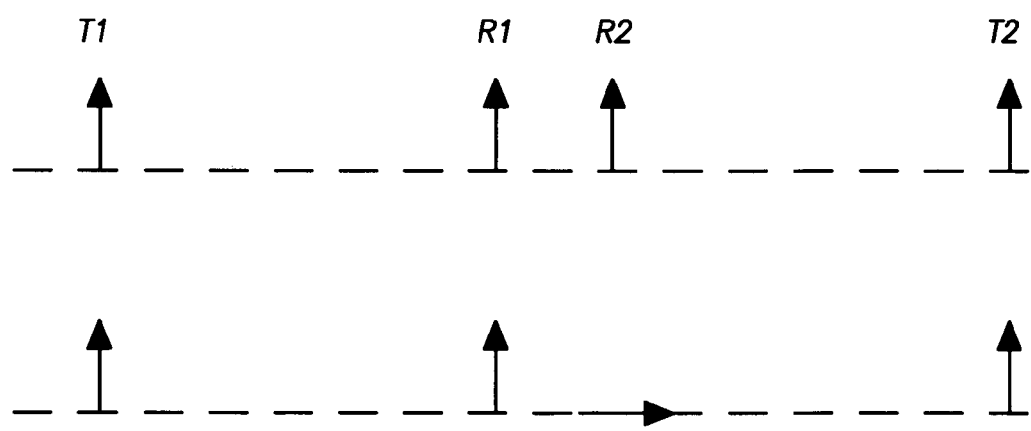
FIG. 2 shows another TMD-based well logging antenna system suited for borehole compensated measurements according to the invention.

The transmitter T2 may also be located at the left of transmitter T1 or on the opposite side of the receivers R1, R2 (not shown). With the transmitters T1, T2 on the same side, the index of receivers is the same and the EM signal measurements are subtracted. The signals are added if the receivers are indexed as first and second corresponding to the near and far receiver as known in the art. FIG. 2 shows an antenna configuration with the receivers R1, R2 located between two TMD transmitters T1, T2. The configuration of FIG. 2 can be used to make a borehole compensated phase-shift and attenuation resistivity measurement. Other embodiments of the invention include configurations similar to those of FIGS. 1 and 2 with variations. For example, other embodiments may entail configurations wherein only one receiver antenna is transversely oriented with respect to the tool axis (not shown).

Figure 3A:
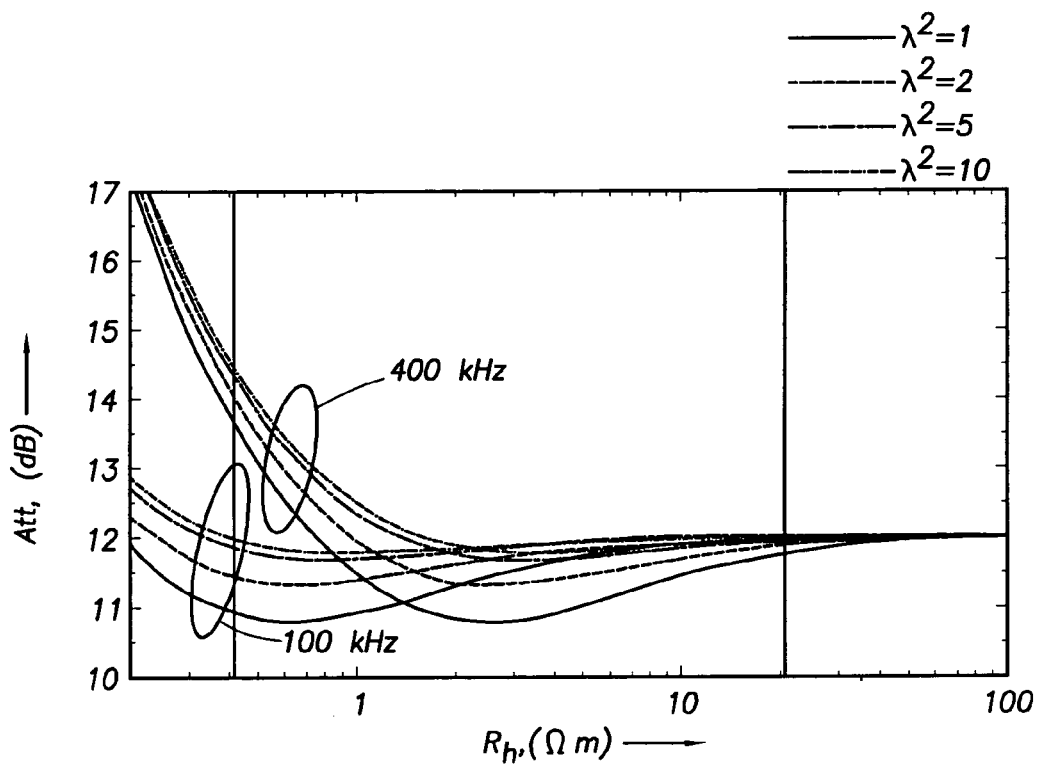
FIG. 3 shows the responses (Phase and Attenuation) of a TMD based propagation tool with a 44-inch [112 cm] spacing in a homogeneous TI anisotropic medium according to the invention.
Figure 3B:
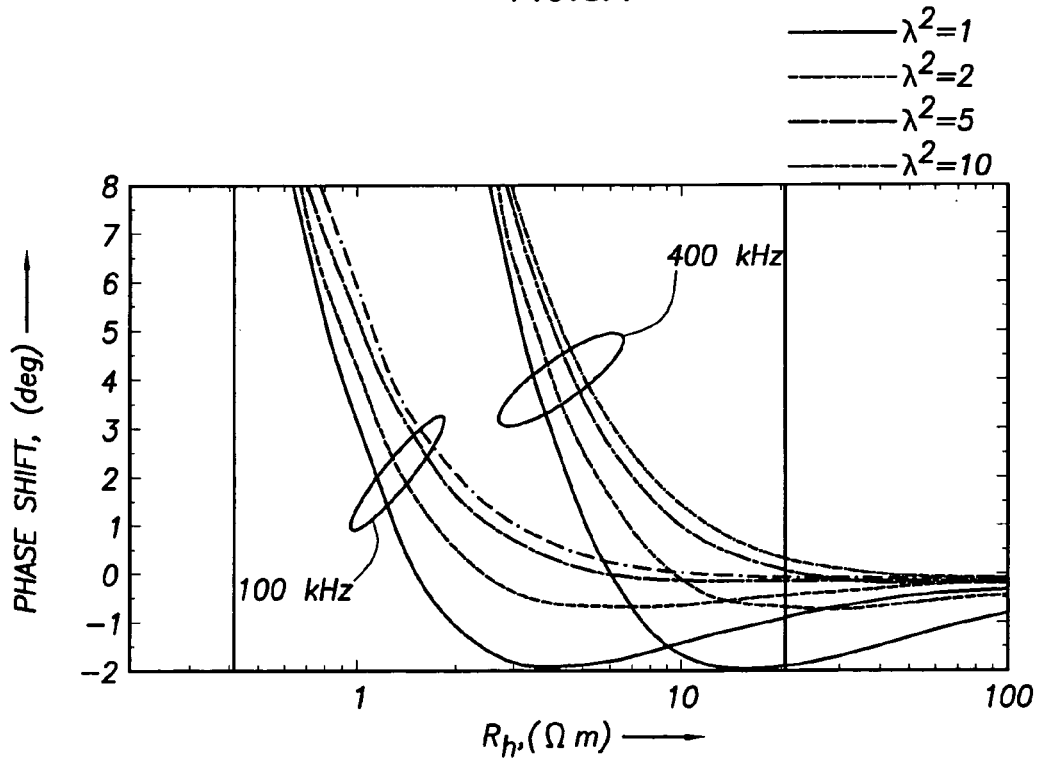
Figure 4A:
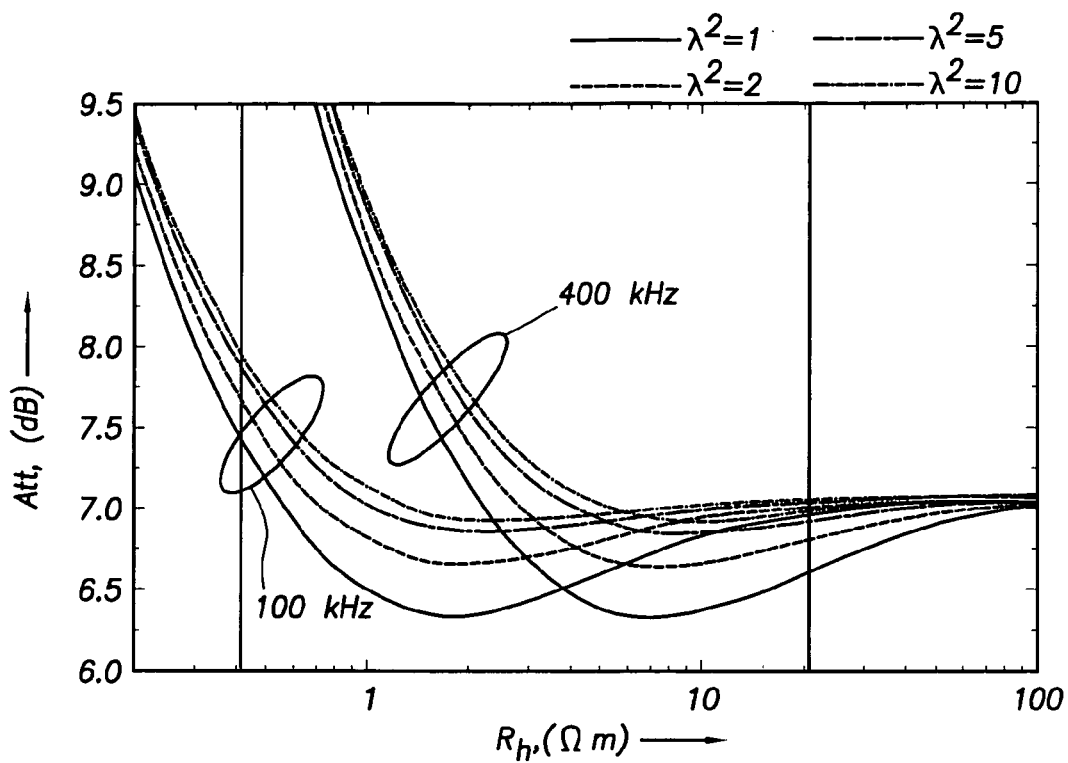
FIG. 4 shows the responses (Phase and Attenuation) of a TMD-based propagation tool with a 74-inch [188 cm] spacing in a homogeneous TI anisotropic medium according to the invention.
Figure 4B:
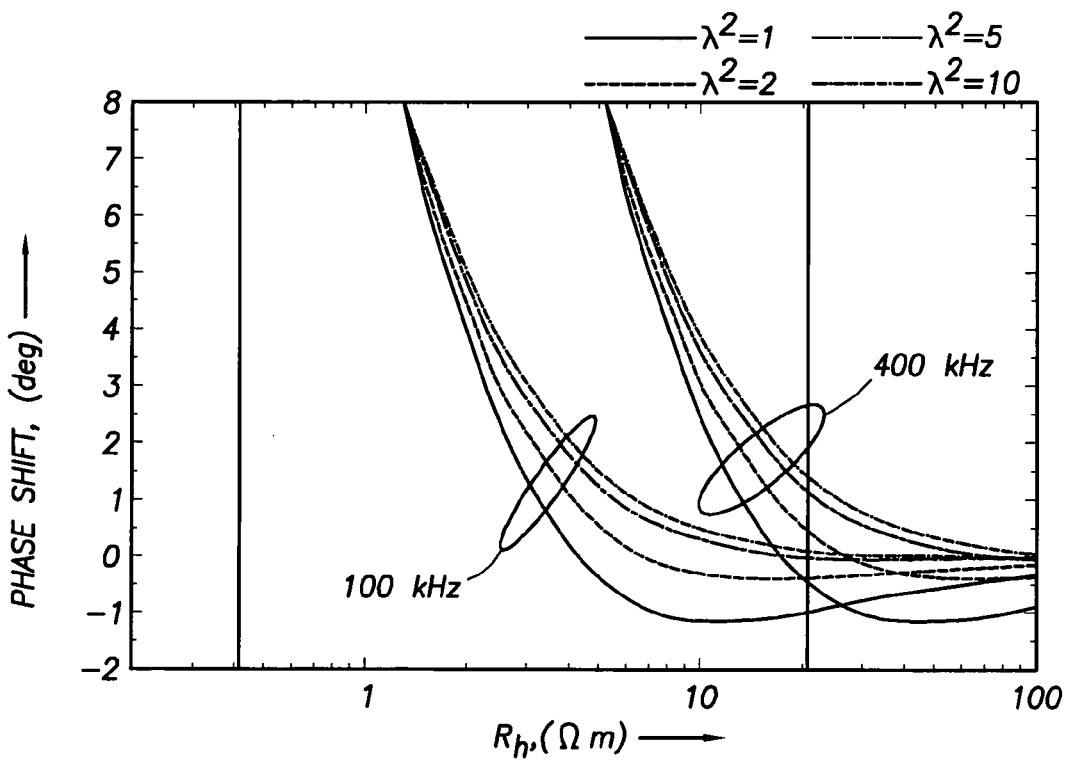

FIGS. 3–4 show a resistivity transform, i.e., a vertical tool reading in a TI anisotropic medium for the antenna configurations of the invention. The tool spacing is (transmitter T1 to mid-point between receivers R1, R2) 44 inches [112 cm] and 74 inches [188 cm] respectively, where the receivers are 20 inches [50.8 cm] apart. Operating frequencies are 100 kHz and 400 kHz. The frames in the diagrams denote the resistivity range where the tool is expected to operate.

Figure 5A:
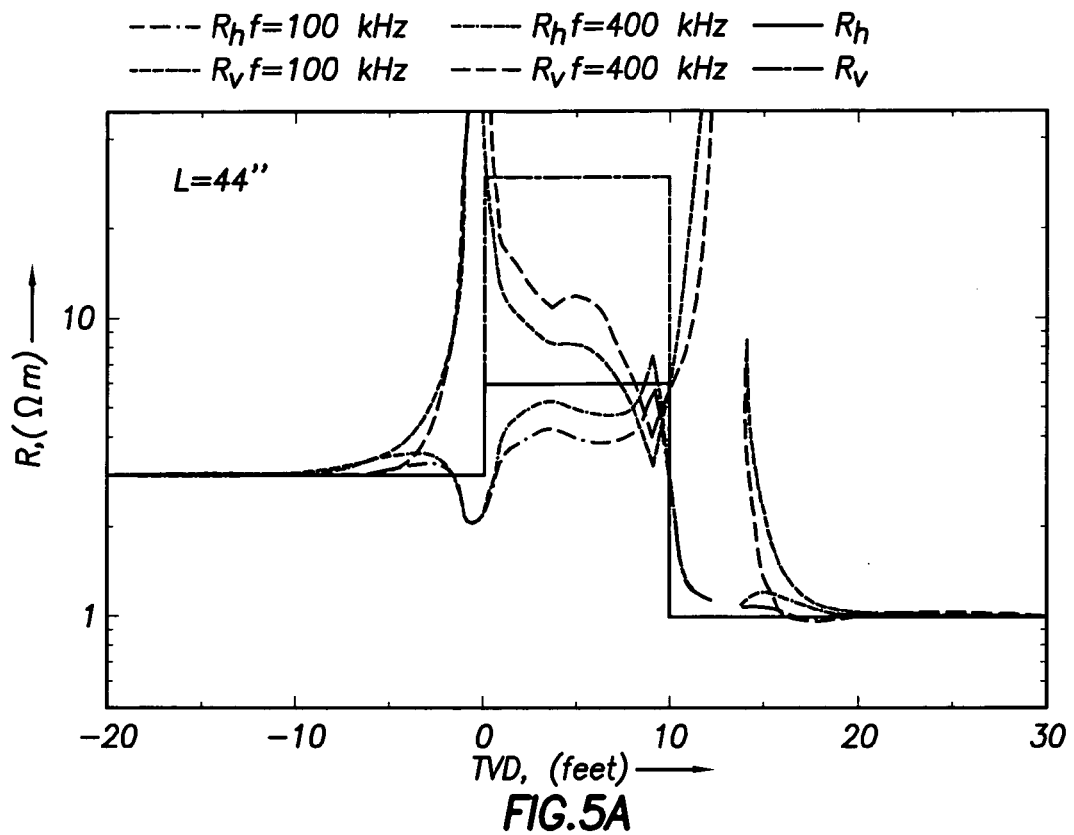
FIG. 5 shows the responses (Resistivity) of a TMD-based propagation tool (spacings L=44 inches [112 cm] and 74 inches [188 cm]) in an anisotropic 10-foot [3 m] bed in a vertical well according to the invention.
Figure 5B:
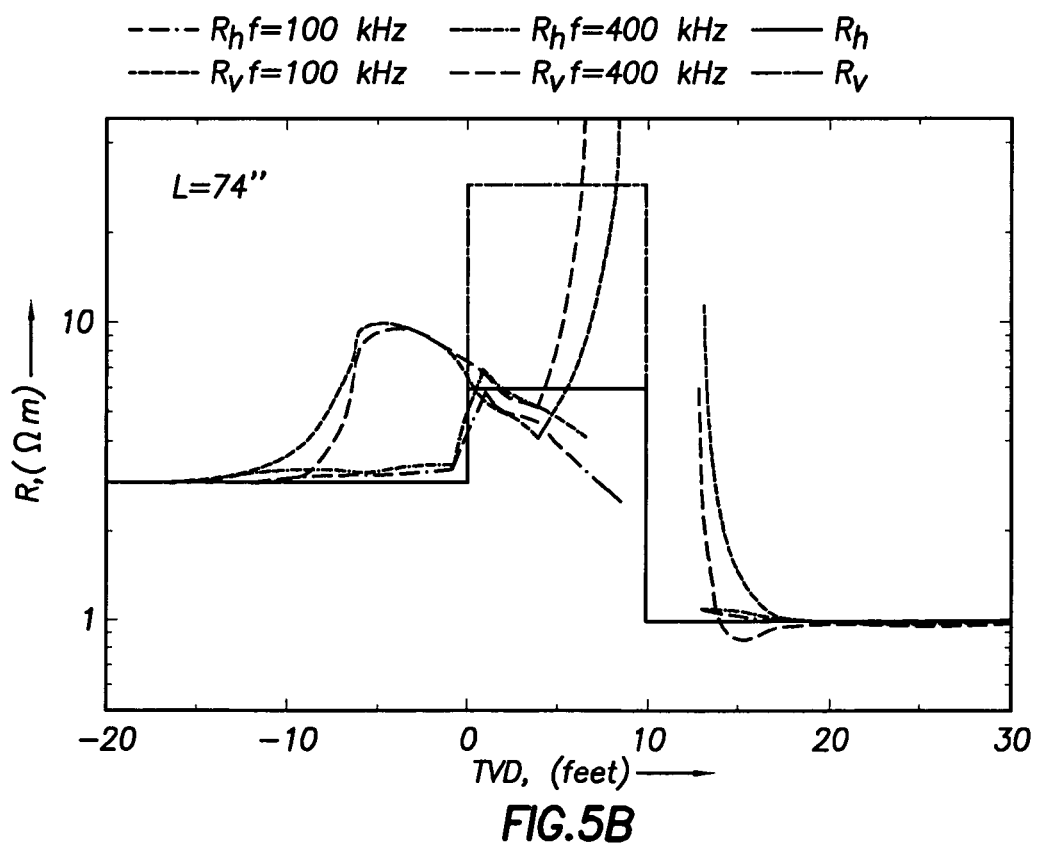
Figure 6A:
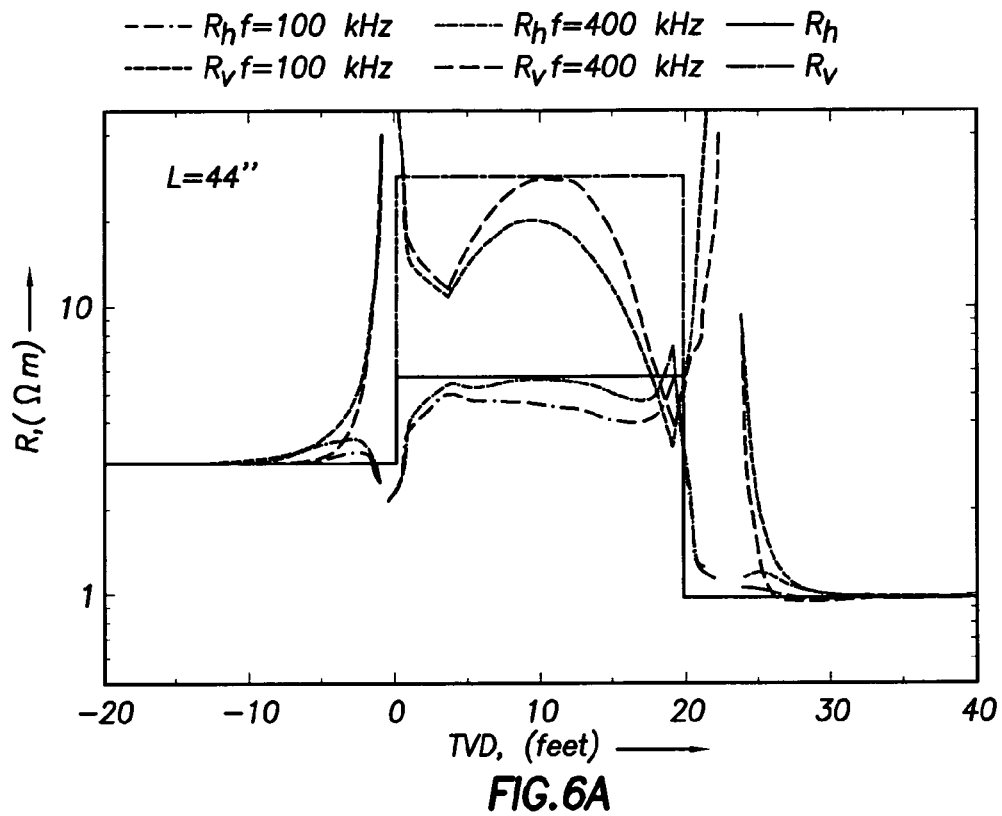
FIG. 6 shows the responses (Resistivity) of a TMD-based propagation tool (spacings L=44 inches [112 cm] and 74 inches [188 cm]) in an anisotropic 20-foot [6.1 m] bed in a vertical well according to the invention.
Figure 6B:
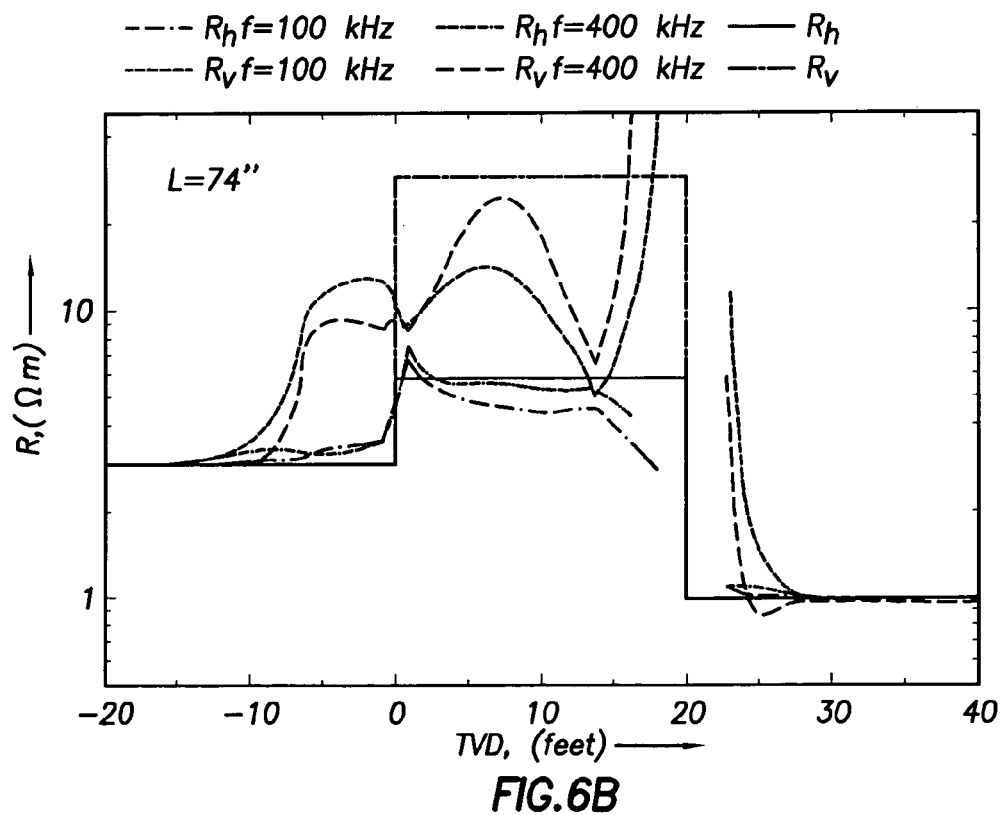

FIGS. 5–6 show the response of the TMD based configurations in a vertical well with a bed thickness of 10 feet [3 m] and 20 feet [6.1 m], respectively. Tool spacings are 44 inches [112 cm] and 74 inches [188 cm], and frequencies are 100 kHz and 400 kHz. It is obvious that only the short spacing at high frequency reads the correct vertical resistivity $R_v$ in the middle of the 20-foot [6.1 m] bed, illustrating very high shoulder-bed effect.

A way of correcting for the shoulder-bed effect is to use an inversion technique. Inversion processing generally includes making an initial estimate, or model, of the geometry of earth formations, and the properties of the formations, surrounding the well logging instrument. The initial model parameters are derived in various ways as known in the art. An expected logging instrument response is calculated based on the initial model. The calculated response is then compared with the measured response of the logging instrument. Differences between the calculated response and the measured response are used to adjust the parameters of the initial model. The adjusted model is used to again calculate an expected response of the well logging instrument. The expected response for the adjusted model is compared to the measured instrument response, and any difference between them is used to again adjust the model. This process is repeated until the differences between the expected response and the measured response fall below a pre-selected threshold.

Figure 7:
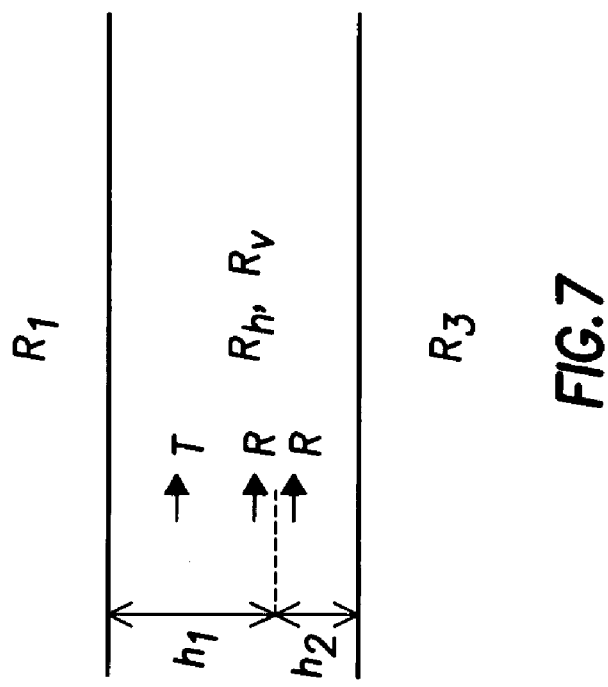
FIG. 7 illustrates a parametric inversion model implementation according to the invention.

In an embodiment of the invention, an initial model is developed for use in an inversion process. One example of such an initial model is shown in FIG. 7. Earth formations are shown as a series of layers or strata. Boundaries between contiguous ones of the layers are shown as solid lines. In the initial model, physical properties of the individual layers in the model can include, for example, resistivity of each layer, the thickness of each layer, and a selected number of layers above and below the layer of interest. While this example initial model has boundaries that are horizontal (perpendicular to gravity), it should be clearly understood that any other subtended angle could be used in developing the initial model. Information about the layer attitude ("dip"), however obtained, can also be entered into the model. The resistive anisotropy $R_h$, $R_v$ is determined in the layer in which the antenna system is disposed, resistivity values for adjacent layers are shown as $R_1$ and $R_3$. The distance between the upper and lower layer boundaries and the mid-point between the receivers R is respectively shown as $h_1$ and $h_2$.

Although the logging system shown in FIG. 7 includes only the one transmitter T, it will be appreciated by those skilled in the art that the measurements may involve any selected number of transmitters and receivers, and may also include calculating an expected response of the instrument at various selected operating frequencies. The instrument responses used in this embodiment may also include multi-axial measurements and time-domain measurements. Appropriate calculation of the response of each such receiver and transmitter in the logging instrument can easily be performed using methods well known in the art. It will also be appreciated that the transmitter T and the receivers R need not be located in the same one of the layers to perform the techniques of the invention. The shoulder beds are assumed to be isotropic.

Figure 8:
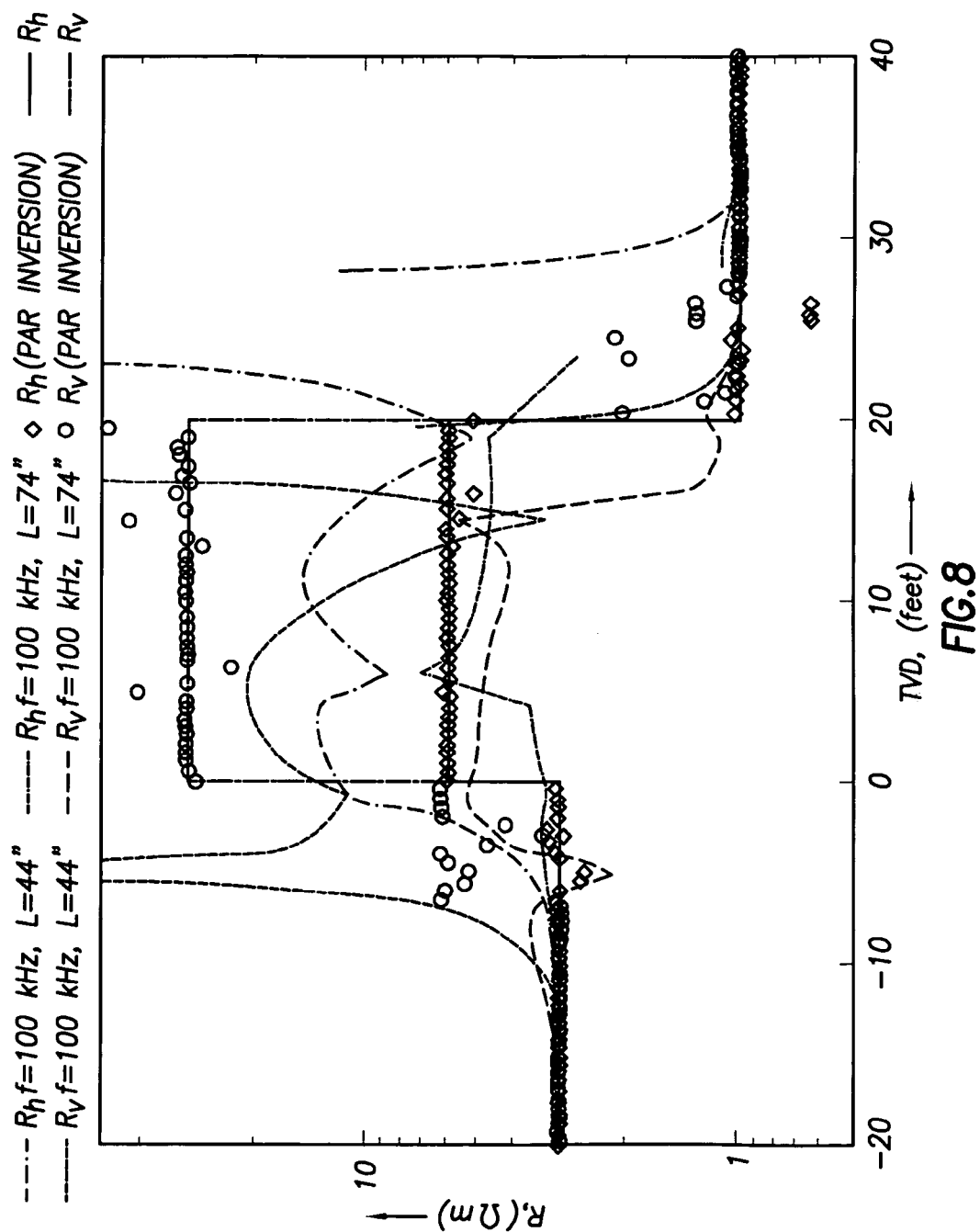
FIG. 8 shows the responses (Resistivity) of FIG. 6 with parametric inversion using the model of FIG. 7.

FIG. 8 shows the results of using the parametric inversion model with the measurements from FIG. 6. The responses of the TMD-based system correspond to a 20-foot [6.1 m] anisotropic bed in a vertical well. Resistivities are fully recovered, although only TMD measurements are used. Because the model-based inversion assumed isotropic shoulder beds, when the tool is outside the anisotropic beds, anisotropy of the nearby bed affects the estimated vertical resistivity. Extension of the model from FIG. 7 to include the anisotropy in shoulder-bed and inclusion of conventional measurements can be used to correct that problem.

Figure 10:
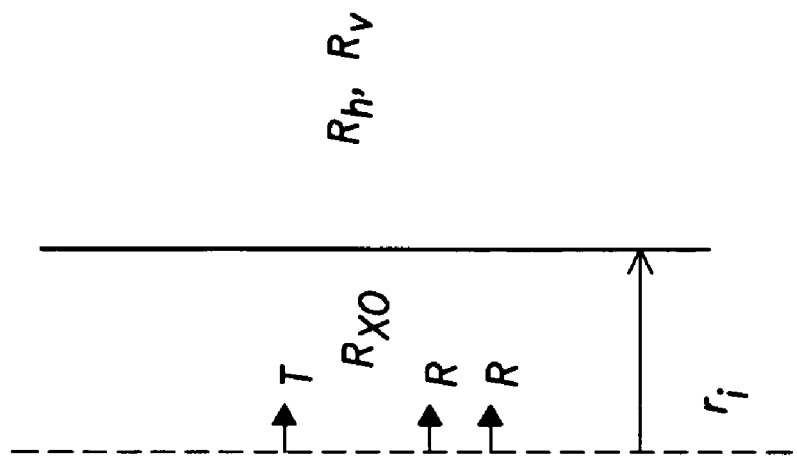
FIG. 10 illustrates a parametric inversion model implementation used to correct for invasion effects according to the invention.
Figure 9A:
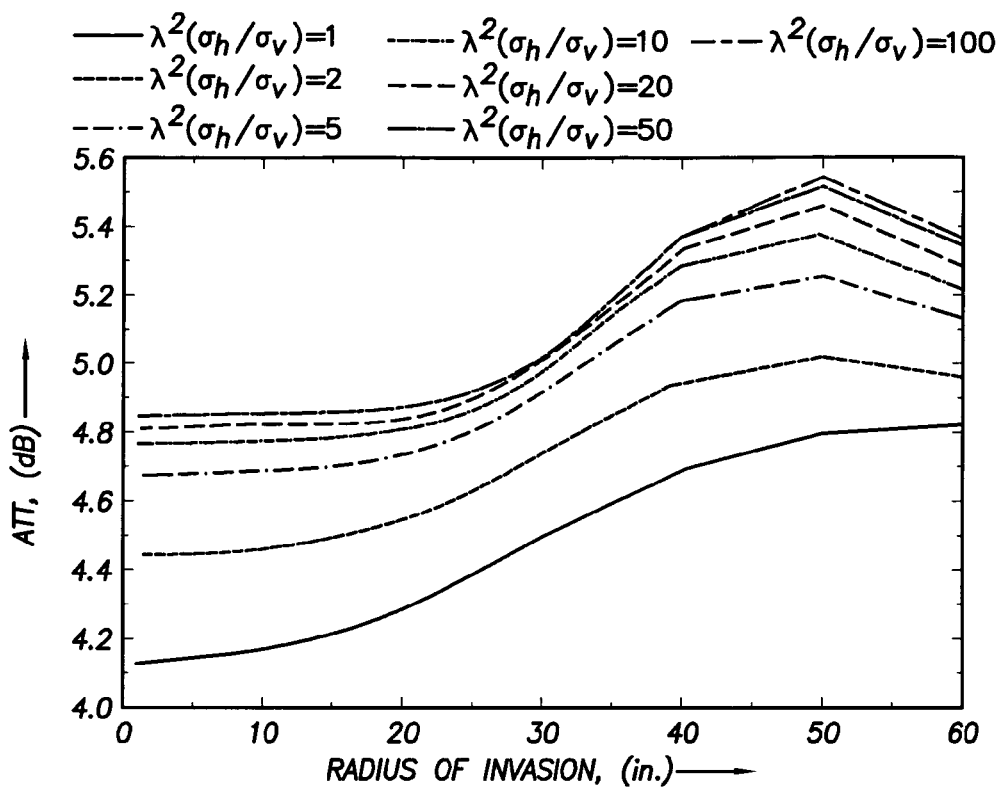
FIG. 9 shows the responses (Attenuation) to invasion in a vertical well of a TMD-based propagation tool with a 74 inch [188 cm] according to the invention.
Figure 9B:
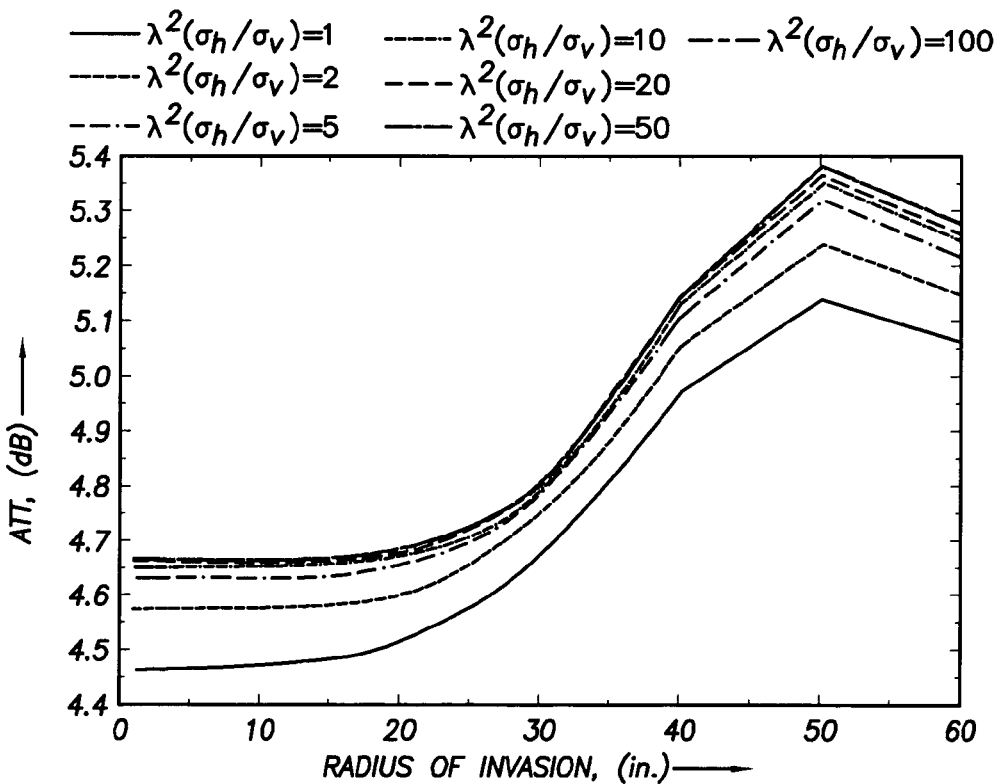

TMD based measurements exhibit strong sensitivity to invasion. Responses of the same 74-inch [188 cm] tool described above, operating at 100 kHz, to invasion of resistivity 1 Ωm and 10 Ωm is shown in FIG. 9. It is obvious that although responses are very sensitive to invasion, there is great sensitivity to anisotropy even for very deep invasion. Similarly to shoulder-bed problem discussed above, parametric inversion may be used to correct the problem. FIG. 10 shows an example model that may be used with the invention to correct the measurements for the effects of invasion. The initial model is shown with a dashed line to represent the antenna support, $R_{xo}$ the invasion resistivity, and $r_i$ is the radius of invasion.

A process for determining a subsurface formation anisotropy parameter according to the invention entails using an elongated support having a longitudinal axis and adapted for subsurface disposal while drilling a borehole through the formation. The process includes selectively transmitting electromagnetic energy into the formation from a plurality of transmitter antennas disposed on the support, at least one of the antennas having its magnetic moment oriented at an angle with respect to the support axis. Electromagnetic signals associated with the energy transmitted from the transmitter antennas is detected with a pair of receiver antennas disposed on the support with their axes oriented at an angle with respect to the support axis. One of the receiver antennas or the at least one angled transmitter antenna is disposed on the support with its respective axis or magnetic moment at a ninety-degree angle with respect to the support axis. The detected electromagnetic signals associated with the transmitter or receiver antenna oriented at the ninety-degree angle are then combined with detected electromagnetic signals associated with another antenna of the plurality of transmitter antennas to determine the anisotropy parameter.

Figure 11:
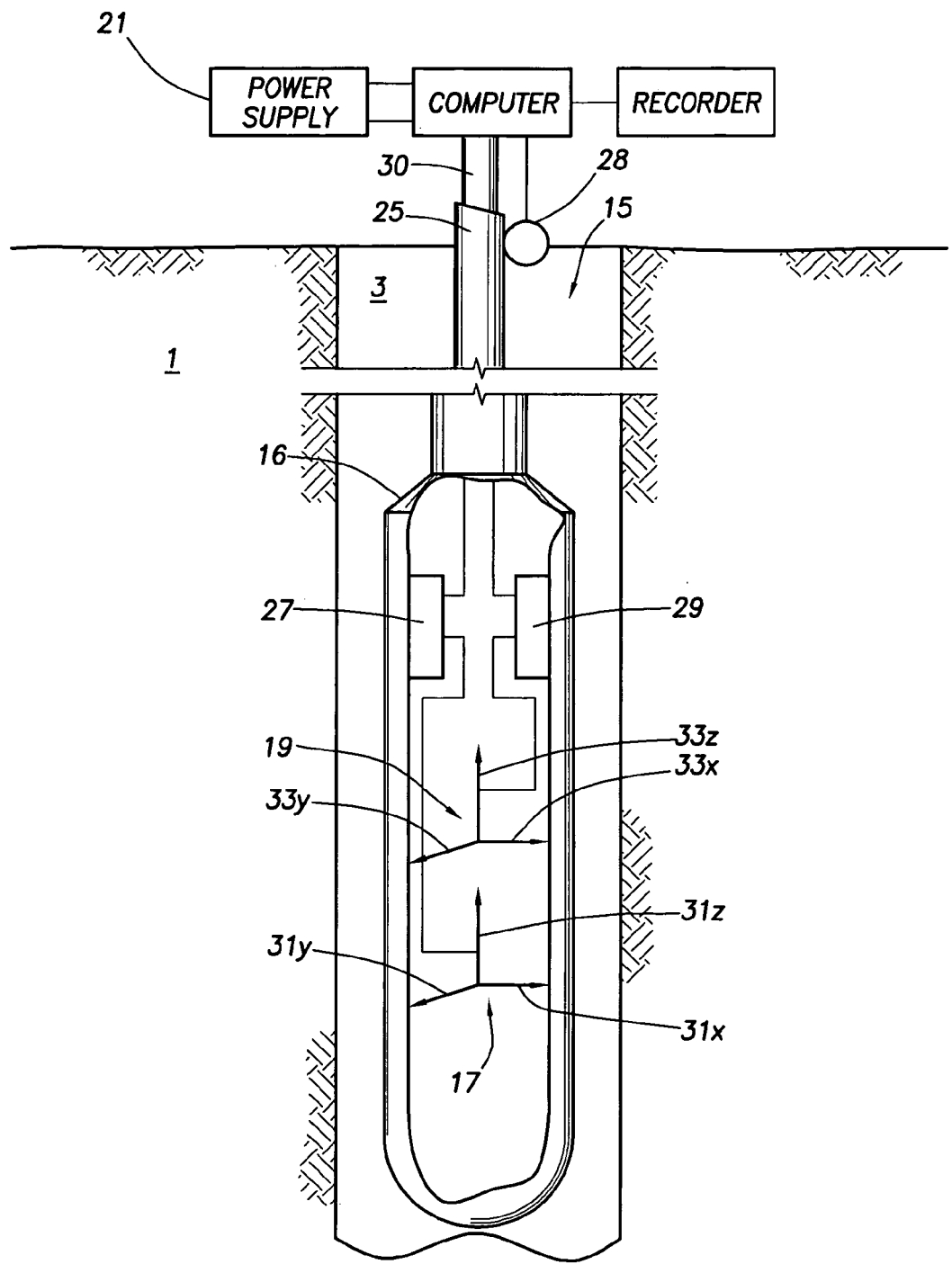
FIG. 11 shows a triaxial electromagnetic logging tool suitable for practicing embodiments of the invention disposed in a borehole.

FIG. 11 shows a well logging system 15 that may be used to implement the invention using a conventional logging tool 16. The logging tool 16 has a triaxial transmitter 19 and a triaxial receiver 17, disposed in a borehole 3 that penetrates a formation 1. The triaxial receiver 17 is arranged such that its axes or sensing directions ($31_x$, $31_y$, and $31_z$) are substantially parallel with the mutually orthogonal magnetic moments ($33_x$, $33_y$, and $33_z$) of the triaxial transmitter 19. The tool 16 is shown supported in the borehole 3 by a logging cable 25 in the case of a wireline system or a drill string 25 in the case of a LWD/LWT system. With a wireline tool, the tool 16 is raised and lowered in the borehole 3 by a winch 28, which is controlled by the surface equipment 21. Logging cable or drill string 25 includes conductors or telemetry means 30 that link the downhole electronics with the surface equipment 21 as known in the art. Downhole electronics comprise a transmitter circuit 27 and a receiver circuit 29. The transmitter circuit 27 controls current flows through the transmitter antennas ($33_x$, $33_y$, $33_z$) to generate magnetic moments $M_x$, $M_y$, and $M_z$ (not shown). The magnetic moments in turn produce eddy currents that flow in the earth formation 1 surrounding the borehole 3. The eddy currents generate secondary magnetic fields. The receiver circuit 29 detects voltages in the receiver antennas ($31_x$, $31_y$, $31_z$) that are induced by the secondary magnetic fields. The detected signals are communicated to the surface equipment 21 for processing using known telemetry means. Alternatively, these signals may be processed in the tool 16, and the processed data are then transmitted to the surface. In some embodiments, the tool 16 may include a motor (not shown) to rotate the triaxial transmitter and the triaxial receiver in the azimuthal direction.

The surface equipment 21 may be adapted to process the received voltages as a function of depths and azimuthal angles of the tool 16. The voltages in the receiver antennas ($31_x$, $31_y$, and $31_z$) can be shown as vector voltages, the magnitudes and phases of which depend on the conductivity of the surrounding earth formation 1. The received voltage is usually expressed as a complex signal (phasor voltage).

It will be apparent to those skilled in the art that this invention may be implemented using one or more suitable general-purpose computers having appropriate hardware and programmed to perform the processes of the invention. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the tool, or shared by the two as known in the art.

It will also be appreciated that the techniques of the invention may be used with any type of well logging system, e.g. wireline tools, LWD/MWD tools, or LWT tools. For the purposes of this specification it will be clearly understood that the word "comprising" means "including but not limited to", and that the word "comprises" has a corresponding meaning.

What is claimed is:

1. A well logging system for determining from propagation measurements an anisotropy parameter of a subsurface formation, comprising:
   an elongated support having a longitudinal axis and adapted for subsurface disposal while drilling a borehole through said formation;
   a plurality of transmitter antennas disposed on the support, at least one of said antennas having its magnetic moment oriented at an angle with respect to the longitudinal axis, each of said antennas adapted to transmit electromagnetic energy, and at least two of the plurality of transmitter antennas do not have their magnetic moments oriented in a same direction;
   a pair of receiver antennas disposed on the support with their magnetic moments each oriented at an angle with respect to the longitudinal axis, said antennas adapted to detect electromagnetic signals associated with the energy transmitted from said transmitter antennas;
   wherein the magnetic moment of the at least one transmitter antenna or one of said receiver antennae is at a ninety-degree angle with respect to the longitudinal axis; and
   processor means adapted to combine detected electromagnetic signals associated with said transmitter or receiver antenna oriented at the ninety-degree angle with detected electromagnetic signals received from another antenna of said plurality of transmitter antennas to determine the anisotropy parameter, wherein the detected electromagnetic signals relate to a phase difference or a magnitude ratio.

2. The well logging system of claim 1, wherein said processor means is adapted to combine the detected electromagnetic signals to compensate for a mismatch between said pair of receiver antennas.

3. The well logging system of claim 2, wherein said mismatch between said receiver pair relates to electromagnetic signal amplitudes or phases.

4. The well logging system of claim 1, further comprising processor means adapted to correct for shoulder-bed effects or invasion effects associated with the detected electromagnetic signals.

5. The well logging system of claim 1, wherein said processor means is adapted to subtract between the detected electromagnetic signals.

6. The well logging system of claim 1, wherein said processor means is adapted to add the detected electromagnetic signals.

7. The well logging system of claim 1, wherein the pair of receiver antennas are each disposed on the elongated support with their magnetic moments at an angle of ninety degrees with respect to said longitudinal axis.

8. The well logging system of claim 1, wherein at least one of said transmitter antennas is disposed on the elongated support with its magnetic moment aligned with the longitudinal axis.

9. The well logging system of claim 8, wherein said processor means is adapted to combine detected electromagnetic signals associated with the transmitter or receiver antenna oriented at the ninety-degree angle with detected electromagnetic signals associated with at least one transmitter antenna having its magnetic moment aligned with said longitudinal axis.

10. The well logging system of claim 1, wherein the pair of receiver antennas are disposed on said support with their axes parallel to one another and in the same azimuthal orientation with respect to said longitudinal axis.

11. A well logging system for determining from propagation measurements an anisotropy parameter of a subsurface formation, comprising:
   an elongated support having a longitudinal axis and adapted for subsurface disposal while drilling a borehole through said formation;
   first and second transmitter antennas disposed on the support with their magnetic moments having the same orientations with respect to the longitudinal axis, said antennas adapted to transmit electromagnetic energy;
   a pair of receiver antennas disposed on the support with their magnetic moments each oriented at an angle with respect to the longitudinal axis and located between said first and second transmitter antennas, said receiver antennas adapted to detect electromagnetic signals, and the pair of receiver antennas do not have their magnetic moments oriented in a same direction; and
   processor means adapted to combine detected electromagnetic signals relating to a phase difference or a magnitude ratio to compensate for a mismatch between said pair of receiver antennas to determine the anisotropy parameter.

12. The logging system of claim 11, wherein said pair of receiver antennas are disposed on the support each with its axis at a ninety-degree angle with respect to said longitudinal axis.

13. The logging system of claim 11, wherein said first and second transmitter antennas are disposed on the support each with its magnetic moment at a ninety-degree angle with respect to said longitudinal axis.

14. The logging system of claim 13, wherein said pair of receiver antennas are disposed on the support each with its axis at a ninety-degree angle with respect to said longitudinal axis.

15. The logging system of claim 11, wherein said first and second transmitter antennas are disposed on the support each with its magnetic moment oriented at an angle with respect to the longitudinal axis and said pair of receiver antennas are disposed on the support each with its axis at a ninety-degree angle with respect to said longitudinal axis.

16. A method for determining from propagation measurements an anisotropy parameter of a subsurface formation in which an elongated support having a longitudinal axis and adapted for subsurface disposal while drilling a borehole through said formation is received, comprising:
   a) selectively transmitting electromagnetic energy into the formation from a plurality of transmitter antennas disposed on the support, at least one of said antennas having its magnetic moment oriented at an angle with respect to the longitudinal axis, and at least two of the plurality of transmitter antennas do not have their magnetic moments oriented in a same direction;
   b) detecting electromagnetic signals associated with the energy transmitted from said transmitter antennas with a pair of receiver antennas disposed on the support with their magnetic moments each oriented at an angle with respect to the longitudinal axis, wherein one of said receiver antennas or the at least one transmitter antenna having its magnetic moment oriented at an angle is disposed with its respective axis or magnetic moment at a ninety-degree angle with respect to the longitudinal axis, wherein the detected electromagnetic signals relate to a phase difference or a magnitude ratio; and
   c) combining detected electromagnetic signals associated with said transmitter or receiver antenna oriented at the ninety-degree angle with detected electromagnetic signals received from another antenna of said plurality of transmitter antennas to determine the anisotropy parameter.

17. The method of claim 16, wherein step c) includes combining the detected electromagnetic signals to compensate for a mismatch between said pair of receiver antennas.

18. The method of claim 17, wherein said mismatch between said receiver pair relates to electromagnetic signal amplitudes or phases.

19. The method of claim 16, further comprising correcting for shoulder-bed effects or invasion effects associated with the detected electromagnetic signals.

20. The method of claim 16, wherein step c) includes subtracting between the detected electromagnetic signals to determine the anisotropy parameter.

21. The method of claim 16, wherein step c) includes adding the detected electromagnetic signals to determine the anisotropy parameter.

22. The method of claim 16, wherein the pair of receiver antennas are each disposed on the elongated support with their magnetic moments oriented at an angle of ninety degrees with respect to said longitudinal axis.

23. The method of claim 16, wherein at least one transmitter antenna is disposed on the elongated support with its magnetic moment aligned with said longitudinal axis.

24. The method of claim 23, wherein step c) includes combining the detected electromagnetic signals associated with the transmitter or receiver antenna oriented at the ninety-degree angle with detected electromagnetic signals associated with the at least one transmitter antenna having its magnetic moment aligned with said longitudinal axis.

25. The method of claim 16, wherein the pair of receiver antennas are disposed on said support with their axes parallel to one another and in the same azimuthal orientation with respect to said longitudinal axis.

* * * * *